July 22, 1952 R. H. RAUEN 2,604,025
AGRICULTURAL IMPLEMENT

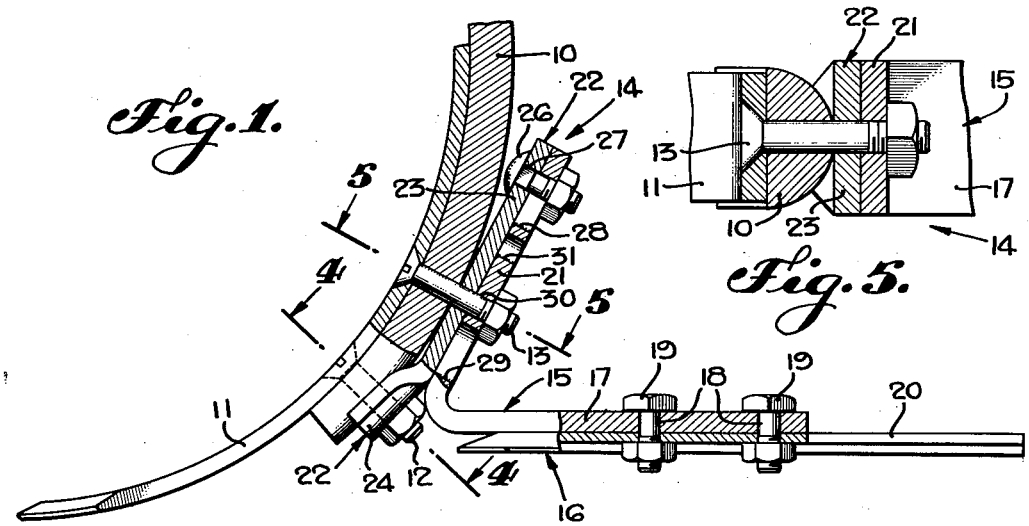
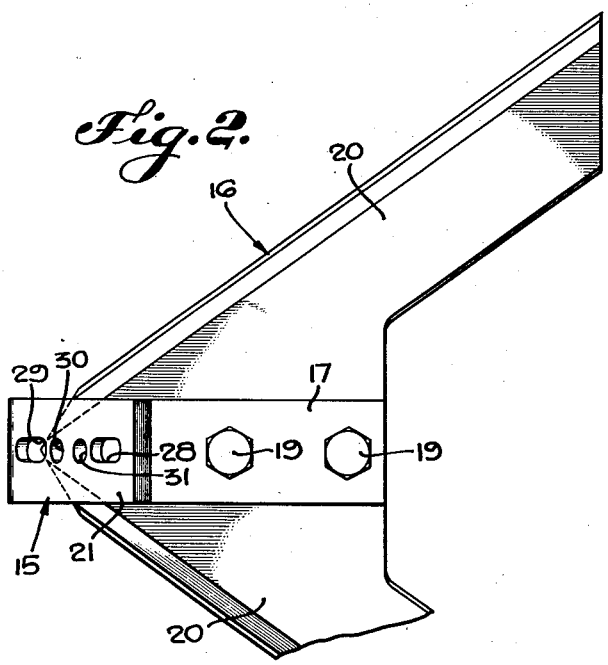
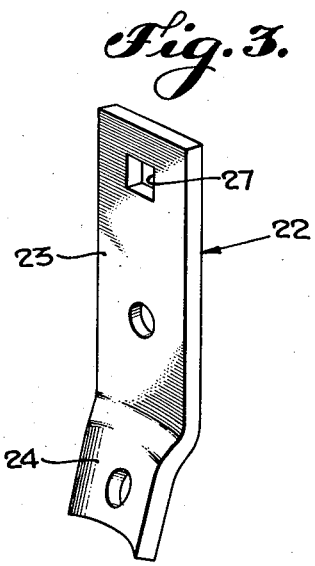
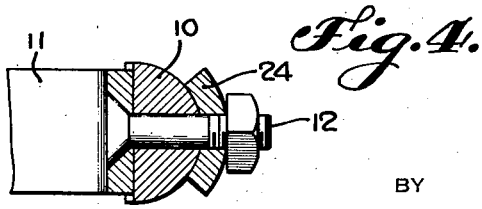
RAYMOND H. RAUEN
INVENTOR.
ATTORNEYS.

Filed Jan. 7, 1950 2 SHEETS—SHEET 2

RAYMOND H. RAUEN,
INVENTOR.

BY *Lyon & Lyon*

ATTORNEYS.

Patented July 22, 1952

2,604,025

UNITED STATES PATENT OFFICE 2,604,025

AGRICULTURAL IMPLEMENT

Raymond H. Rauen, Glendale, Calif., assignor to United States Spring & Bumper Co., Los Angeles, Calif., a corporation of California Application January 7, 1950, Serial No. 137,359

8 Claims. (Cl. 97—205)

1

This invention relates to agricultural implements. It has particular reference to ground contacting tools adapted to be carried on a mobile frame.

One of the objects of my invention is to provide novel means for attaching a tool such as a knife to the lower end of a curved shank of the type used for carrying cultivator shovels, chisel plows, or the like.

Another object of my invention is to provide a novel form of attaching device for releasably securing an agricultural tool to the lower end of a curved shank.

A further object of my invention is to provide a novel form of attaching device for releasably securing a horizontally disposed agricultural tool to the lower end of a curved shank, the attaching device having novel adjustment means whereby the tool may be raised or lowered with respect to the shank without disturbing the horizontal disposition of the tool.

Curved shanks used in plowing and cultivating generally have a straight upper portion for attachment to a mobile frame. The curved portion may be rectangular or it may be of the type which is directed to a shank having a curved or rounded cross-section.

A further object of my invention is then, the provision of novel adapter or shoe devices by means of which an implement such as a knife may be adjustably secured to shanks having various cross-sectional shapes.

Other object and advantages it is believed will be apparent from the following detailed description of preferred embodiments thereof as illustrated in the accompanying drawings.

In the drawings:

Figure 1 is a side elevation, partly in section, illustrating details of an agricultural implement embodying my invention as adapted to be attached to a shank of curved cross-section;

Figure 2 is a plan view of the attaching bracket and cutting knife, the shoe, shank and forward-pointing tool being omitted for clarity of illustration;

Figure 3 is a perspective view of the shoe or adapter shown in Figure 1;

Figure 4 is a sectional elevation taken substantially on the lines 4—4 of Figure 1;

Figure 5 is a sectional elevation taken substantially on the lines 5—5 of Figure 1;

2

Figure 6:
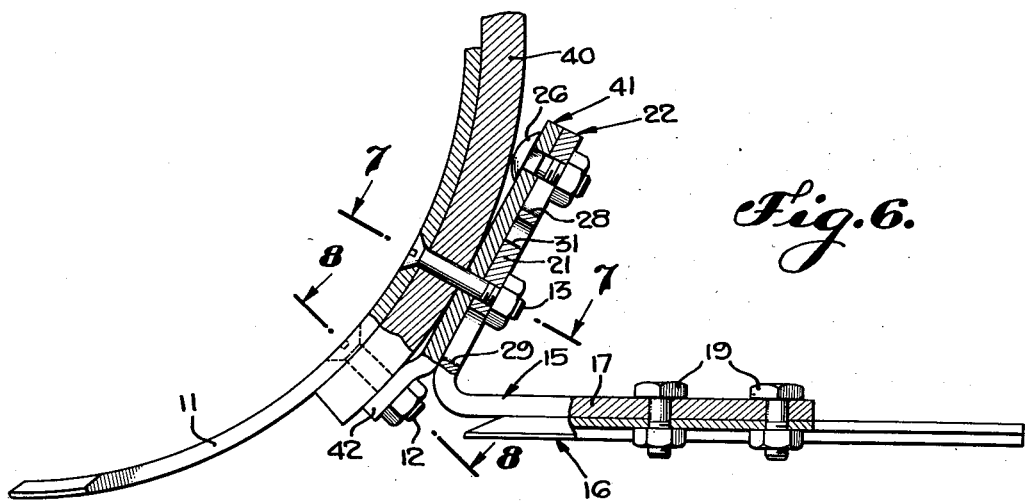
Figure 6 is a side elevation, partly in section, illustrating details of an agricultural implement embodying my invention as adapted to be attached to a shank having a rectangular cross-section.
Figure 7:
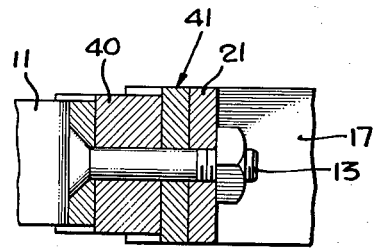
Figure 8:
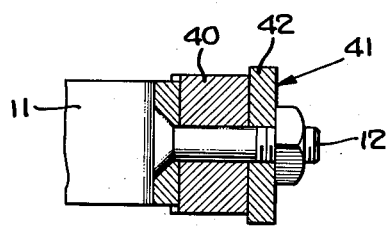
Figure 9:
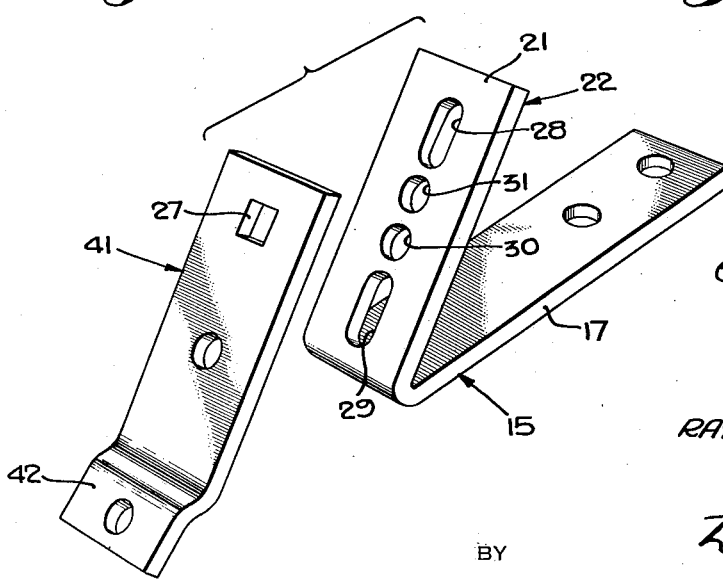

Figure 7 is a sectional elevation taken substantially on the lines 7—7 of Figure 1;

Figure 8 is a sectional elevation taken substantially on the lines 8—8 of Figure 1; and Figure 9 is an exploded perspective view of the shoe and bracket shown in Figure 6.

Referring now to the drawings, the agricultural shank 10 may be supported on a mobile frame in the manner shown in any conventional manner. Secured to the lower end of the curved shank 10 and carried on the forward portion of the curve is a ground engaging tool 11, which is attached to the shank by means of the releasable bolts 12 and 13 extending through the tool 11 and the shank 10. These bolts further secure the attaching device, generally indicated at 14, to the rear or trailing portion of the curved shank in the manner described below.

The attaching device 14 includes a V-shaped bracket 15 which carries a tool such as the horizontal knife 16. The base portion 17 of the bracket is provided with apertures 18 through which attaching bolts 19 extend for connecting the knife 16 to the attaching device 14. The knife 16 comprises a pair of diverging blades 20 which may be formed as a single integral blade as shown, or if desired may be formed from two separate blades. Interposed between the tongue portion 21 of the bracket 15 and the shank 10 is an adapter member or shoe 22. Referring particularly to Figure 3, it will be seen that the shoe 22 comprises a straight, flat upper portion 23 and a transversely curved, forwardly extending lower portion 24. As shown in Figure 1, the short bolt 12 extends through the lower portion 24 of the shoe, the long bolt 13 extending through both the straight portion 23 of the shoe and the tongue 21 of the bracket 15. Further connection means between the shoe and the bracket are provided by the carriage bolt 26 which extends through the square opennig 27 in the upper portion of the shoe 22 and through the slotted opening 28 in the tongue 21. The slots 28 and 29 and holes 30 and 31 in the tongue 21 provide means for vertical adjustment of the knife 16. It will be noted that the tongue 21 contacts the shoe 22 only along the straight portion 23 thereof, so that regardless of the vertical position of the tongue with respect to the shoe, the blade may be maintained in a horizontal position.

The particular shape of the shoe 22 provides for a very rigid mounting for the attaching device 14, and at the same time provides means for vertical adjustment of the knife 16 without disturbing the horizontal disposition thereof.

The lower portion 24 of the shoe is curved to conform to the back side of the curved shank 10 and is bent on an angle with respect to the straight portion 23 of the shoe so that the straight portion may be held tangentially against the shank by the bolt 13.

A modified form of my invention is illustrated in Figures 6–9, wherein the attaching device is shown as adapted to be secured to a curved shank 40 of rectangular cross-section. The bracket, knife and connecting bolts are identical with those described above. The adapter member or shoe 41 is similar to the shoe 22 described above, with the exception that the lower portion 42 is rectangular in cross-section so that the shoe may be securely attached to the shank.

While I have shown and described specific embodiments of my invention, I do not limit myself to the exact details of the constructions set forth, and the invention embraces such changes, modifications and equivalents of the parts and their formation and arrangement as come within the purview of the appended claims.

I claim:

1. In a device for connecting a ground engaging tool to the lower portion of a curved shank, the combination of: a shoe member secured to the curved shank, said shoe member having a flat back side; a bracket having a tongue portion with a flat forward side, said bracket being releasably secured to the shoe member with the flat forward side of the tongue portion in contact with the flat back side of the shoe member; and means on said bracket for attaching the ground engaging tool thereto.

2. In a device for connecting a ground engaging tool to the lower portion of a curved shank, the combination of: a shoe member secured to the curved shank, said shoe member having a flat back side; a substantially horizontal base for connection with the ground engaging tool; a tongue member formed integrally with the base and extending upwardly therefrom, said tongue member having a flat forward side; and longitudinally spaced apertures extending through the tongue for securing the tongue to the shoe with the flat side of the tongue contacting the flat side of the shoe.

3. In a device for connecting a ground engaging tool to the lower portion of a curved shank, the combination of: a shoe member secured to the curved shank, said shoe member having a straight upper portion tangent to the curved shank and a lower portion integral with the upper portion and inclined at an angle to extend forwardly therefrom; a substantially horizontal base for connection with the ground engaging tool; a tongue member formed integrally with the base and extending upwardly therefrom, said tongue member having a flat forward side; and longitudinally spaced apertures extending through the tongue for securing the tongue to the shoe with the flat side of the tongue contacting the straight upper portion of the shoe.

4. In a device for connecting a ground engaging tool to the lower portion of a curved shank, the combination of: a shoe member secured to the curved shank, said shoe member having a straight upper portion tangent to the curved shank and a lower portion integral with the upper portion and inclined at an angle to extend forwardly therefrom; a substantially horizontal base for connection with the ground engaging tool; a tongue member formed integrally with the base and extending upwardly therefrom, said tongue member having a flat forward side; and longitudinally spaced apertures extending through the tongue for securing the tongue to the shoe with the flat side of the tongue contacting the straight upper portion of the shoe, said apertures including longitudinal slots for adjustment of said tongue with respect to the shoe member.

5. In a device for connecting a ground engaging tool to the lower portion of a curved shank having a rectangular cross section, the combination of: a shoe member secured to the shank, said shoe member having a straight upper portion tangent to the curved shank and a straight lower portion integral with the upper portion and extending forwardly therefrom to contact the shank; a substantially horizontal base for connection with the ground engaging tool; a tongue member formed integrally with the base and extending upwardly therefrom, said tongue member having a flat forward side; and longitudinally spaced apertures extending through the tongue for securing the tongue to the shoe with the flat side of the tongue contacting the straight upper portion of the shoe.

6. In a device for connecting a ground engaging tool to the lower portion of a curved shank having a rectangular cross section, the combination of: a shoe member secured to the shank, said shoe member having a straight upper portion tangent to the curved shank and a straight lower portion integral with the upper portion and extending forwardly therefrom to contact the shank; a substantially horizontal base for connection with the ground engaging tool; a tongue member formed integrally with the base and extending upwardly therefrom, said tongue member having a flat forward side; and longitudinally spaced apertures extending through the tongue for securing the tongue to the shoe with the flat side of the tongue contacting the straight upper portion of the shoe, said apertures including longitudinal slots for adjustment of said tongue with respect to the shoe member.

7. In a device for connecting a ground engaging tool to the lower portion of a shank which is curved longitudinally and has a transversely curved back side, the combination of: a shoe member secured to the curved shank, said shoe member having a straight upper portion tangent to the curved shank and a lower portion integral with the upper portion and extending forwardly therefrom, said lower portion being curved transversely to provide a socket for reception in the transversely curved back side of the curved shank; a substantially horizontal base for connection with the ground engaging tool; a tongue member formed integrally with the base and extending upwardly therefrom, said tongue member having a flat forward side; and longitudinally spaced apertures extending through the tongue for securing the tongue to the shoe with the flat side of the tongue contacting the straight upper portion of the shoe.

8. In a device for connecting a ground engaging tool to the lower portion of a shank which is curved longitudinally and has a transversely curved back side, the combination of: a shoe member secured to the curved shank, said shoe member having a straight upper portion tangent to the curved shank and a lower portion integral with the upper portion and extending forwardly therefrom, said lower portion being curved transversely to provide a socket for reception in the transversely curved back side of the curved shank; a substantially horizontal base for connection with the ground engaging tool; a tongue member formed integrally with the base and extending upwardly therefrom, said tongue member having a flat forward side; and longitudinally spaced apertures extending through the tongue for securing the tongue to the shoe with the flat side of the tongue contacting the straight upper portion of the shoe, said apertures including longitudinal slots for adjustment of said tongue with respect to the shoe member.

RAYMOND H. RAUEN.

REFERENCES CITED

The following references are of record in the file of this patent:

UNITED STATES PATENTS

| Number | Name | Date |
|---|---|---|
| 1,630,585 | Simons | May 31, 1927 |
| 2,333,371 | Graham | Nov. 2, 1943 |